United States Patent
Elomari

(10) Patent No.: US 9,216,911 B2
(45) Date of Patent: *Dec. 22, 2015

(54) METHOD FOR PREPARING CHA-TYPE MOLECULAR SIEVES USING AN ALKALI METAL SILICATE PRECURSOR AND NOVEL STRUCTURE DIRECTING AGENTS

(71) Applicant: Chevron U.S.A. Inc., San Ramon, CA (US)

(72) Inventor: Saleh Ali Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/042,923

(22) Filed: Oct. 1, 2013

(65) Prior Publication Data

US 2015/0093327 A1    Apr. 2, 2015

(51) Int. Cl.
| | |
|---|---|
| *C01B 33/36* | (2006.01) |
| *C01B 39/04* | (2006.01) |
| *C01B 39/48* | (2006.01) |
| *B01J 29/04* | (2006.01) |
| *B01J 29/70* | (2006.01) |

(52) U.S. Cl.
CPC .................. *C01B 39/48* (2013.01); *C01B 39/04* (2013.01); *B01J 29/04* (2013.01); *B01J 29/70* (2013.01)

(58) Field of Classification Search
CPC ........ C01B 39/48; C01B 37/02; C01B 39/04; B01J 29/70; B01J 29/85; B01J 29/04; C07C 2/12

See application file for complete search history.

(56) References Cited

U.S. PATENT DOCUMENTS

| | | | | | |
|---|---|---|---|---|---|
| 6,468,485 | B1 * | 10/2002 | Elomari | ...................... | 423/213.2 |
| 6,475,463 | B1 * | 11/2002 | Elomari et al. | ................ | 423/706 |
| 6,544,495 | B1 * | 4/2003 | Elomari | ........................ | 423/706 |
| 2002/0081262 | A1 * | 6/2002 | Elomari | ........................ | 423/704 |
| 2002/0085976 | A1 * | 7/2002 | Elomari | ........................ | 423/706 |
| 2007/0032692 | A1 * | 2/2007 | O'Rear et al. | ................. | 585/752 |
| 2007/0286798 | A1 * | 12/2007 | Cao et al. | ....................... | 423/702 |
| 2014/0241980 | A1 * | 8/2014 | Zones et al. | ................... | 423/704 |

FOREIGN PATENT DOCUMENTS

EP    2368849    9/2011

OTHER PUBLICATIONS

Allen Burton and Saleh Elomari, "SSZ-60: a new large-pore zeolite related to ZSM-23", Chem. Commun., 2004, 2618-2619.*
Sandra Leiva, Maria José Sabater et al, "A new synthesis method for the preparation of ITQ-7 zeolites and the characterisation of the resulting materials", C. R. Chimie 8 (2005) 369-378.*

(Continued)

*Primary Examiner* — Bijay Saha
(74) *Attorney, Agent, or Firm* — Michael D. Ross

(57) ABSTRACT

The present invention is directed to a process for preparing CHA-type molecular sieves using a colloidal aluminosilicate composition containing a cationic structure directing agent selected from the group consisting of N-cyclohexyl-N-methylpyrrolidinium, N-cyclohexyl-N-ethylpyrrolidinium, N-methyl-N-(3-methylcyclohexyl)pyrrolidinium, N-ethyl-N-(3-methylcyclohexyl)pyrrolidinium, N-methyl-N-(2-methylcyclohexyl)-pyrrolidinium, N-ethyl-N-(2-methylcyclohexyl)pyrrolidinium, and mixtures thereof.

16 Claims, 12 Drawing Sheets

(56) References Cited

OTHER PUBLICATIONS

Sastre et al, Computational and Experimental Approach to the Role of Structure-Directing Agents in the Synthesis of Zeolites: The Case of Cyclohexyl Alkyl Pyrrolidinium Salts in the Synthesis of B, EU-1, ZSM-11, and ZSM-12 Zeolites, J. Phys. Chem. B, 2003, 107, 5432-5440.*

PCT/US2014/057105, Notification of Transmittal of the International Search Report and the Written Opinion of the International Searching Authority, or the Declaration, mail date Feb. 3, 2015, 15 pages.

Corma, A., et al., "An Study of Cyclohexylpyrrolodine-Derived Quaternary Organic Cations as Structure Directing Agents for Synthesis of Zeolites" Recent Advances in the Science and Technology of Zeolites and Related Materials: Proceedings of the 14th International Zeolite Conference Cape Town, South Africa, Apr. 25-30, 2004, vol. 154.

* cited by examiner

METHOD FOR PREPARING CHA-TYPE MOLECULAR SIEVES USING AN ALKALI METAL SILICATE PRECURSOR AND NOVEL STRUCTURE DIRECTING AGENTS

FIELD OF THE INVENTION

The present invention is directed to a process for preparing CHA-type molecular sieves using an alkali metal silicate and a cationic structure directing agent selected from the group consisting of N-cyclohexyl-N-methylpyrrolidinium, N-cyclohexyl-N-ethylpyrrolidinium, N-methyl-N-(3-methylcyclohexyl)pyrrolidinium, N-ethyl-N-(3-methylcyclohexyl)pyrrolidinium, N-methyl-N-(2-methylcyclohexyl)pyrrolidinium, N-ethyl-N-(2-methylcyclohexyl)pyrrolidinium cations, and mixtures thereof.

BACKGROUND OF THE INVENTION

Molecular sieves are a commercially important class of crystalline materials. They have distinct crystal structures with ordered pore structures which are demonstrated by distinct X-ray diffraction patterns. The crystal structure defines cavities and pores which are characteristic of the different species.

Molecular sieves identified by the International Zeolite Associate (IZA) as having the structure code CHA are known. For example, the molecular sieve known as SSZ-13 is a known crystalline CHA material. It is disclosed in U.S. Pat. No. 4,544,538, issued Oct. 1, 1985 to Zones. In that patent, the SSZ-13 molecular sieve is prepared in the presence of a N-alkyl-3-quinuclidinol cation, a N,N,N-trialkyl-1-adamantammonium cation and/or, and N,N,N-trialkyl-2-exoaminonorbornane cation as the structure-directing agent (SDA).

U.S. Publication No. 2007-0286798 to Cao et al., published Dec. 13, 2007, discloses the preparation of CHA-type molecular sieves using various SDAs, including a N,N,N-trimethyl-2-adamantammonium cation.

However, SDAs useful for making CHA materials are complex and typically not available in quantities necessary to produce CHA materials on a commercial scale. In addition, there is a continuous need to reduce the concentration of known CHA SDAs in the reaction mixture to an absolute minimum, or replace them entirely with SDAs that are cheaper, less complex and/or reduce the time necessary to form product.

It has now been found that CHA-type molecular sieves can be prepared using an alkali metal silicate and at least one of the novel structure directing agents described herein below.

SUMMARY OF THE INVENTION

In accordance with the present invention there is provided a method of preparing CHA-type molecular sieves by contacting under crystallization conditions (1) an alkali metal silicate; (2) one or more sources of one or more oxides selected from the group consisting of oxides of trivalent elements, pentavalent elements, and mixtures thereof; (3) at least one source of an element selected from Groups 1 and 2 of the Periodic Table; (4) at least one structure directing agent selected from the group consisting of cations represented by structures (1) through (6) below; and (5) hydroxide ions.

The present invention also includes a process for preparing a CHA-type molecular sieve by:

(a) preparing a reaction mixture containing (1) an alkali metal silicate; (2) one or more sources of one or more oxides selected from the group consisting of oxides of trivalent elements, pentavalent elements, and mixtures thereof; (3) at least one source of an element selected from Groups 1 and 2 of the Periodic Table; (4) at least one structure directing agent selected from the group consisting of cations represented by structures (1) through (6) below; (5) hydroxide ions; and (6) water; and (b) subjecting the reaction mixture to crystallization conditions sufficient to form crystals of the CHA-type molecular sieve.

Where the molecular sieve formed is an intermediate material, the process of the present invention includes a further post-crystallization processing in order to achieve the target molecular sieve (e.g. by post-synthesis heteroatom lattice substitution or acid leaching).

The present invention also provides a CHA-type molecular sieve having a composition, as-synthesized and in the anhydrous state, in terms of mole ratios, as follows:

|  | Broadest | Secondary |
|---|---|---|
| $SiO_2/X_2O_a$ | 10-300 | 20-100 |
| $Q/SiO_2$ | 0.05-0.4 | 0.1-0.2 |
| $M/SiO_2$ | 0.01-1 | 0.2-0.6 | wherein:

(1) X is selected from the group consisting of trivalent and pentavalent elements from Groups 3-13 of the Periodic Table, and mixtures thereof;

(2) stoichiometric variable a equals the valence state of compositional variable X (e.g. when X is trivalent, a=3; when X is pentavalent, a=5);

(3) M is selected from the group consisting of elements from Groups 1 and 2 of the Periodic Table; and (4) Q is one of the novel structure directing agents represented by structures (1) through (6) below

DETAILED DESCRIPTION OF THE INVENTION

Introduction

Figure 1:
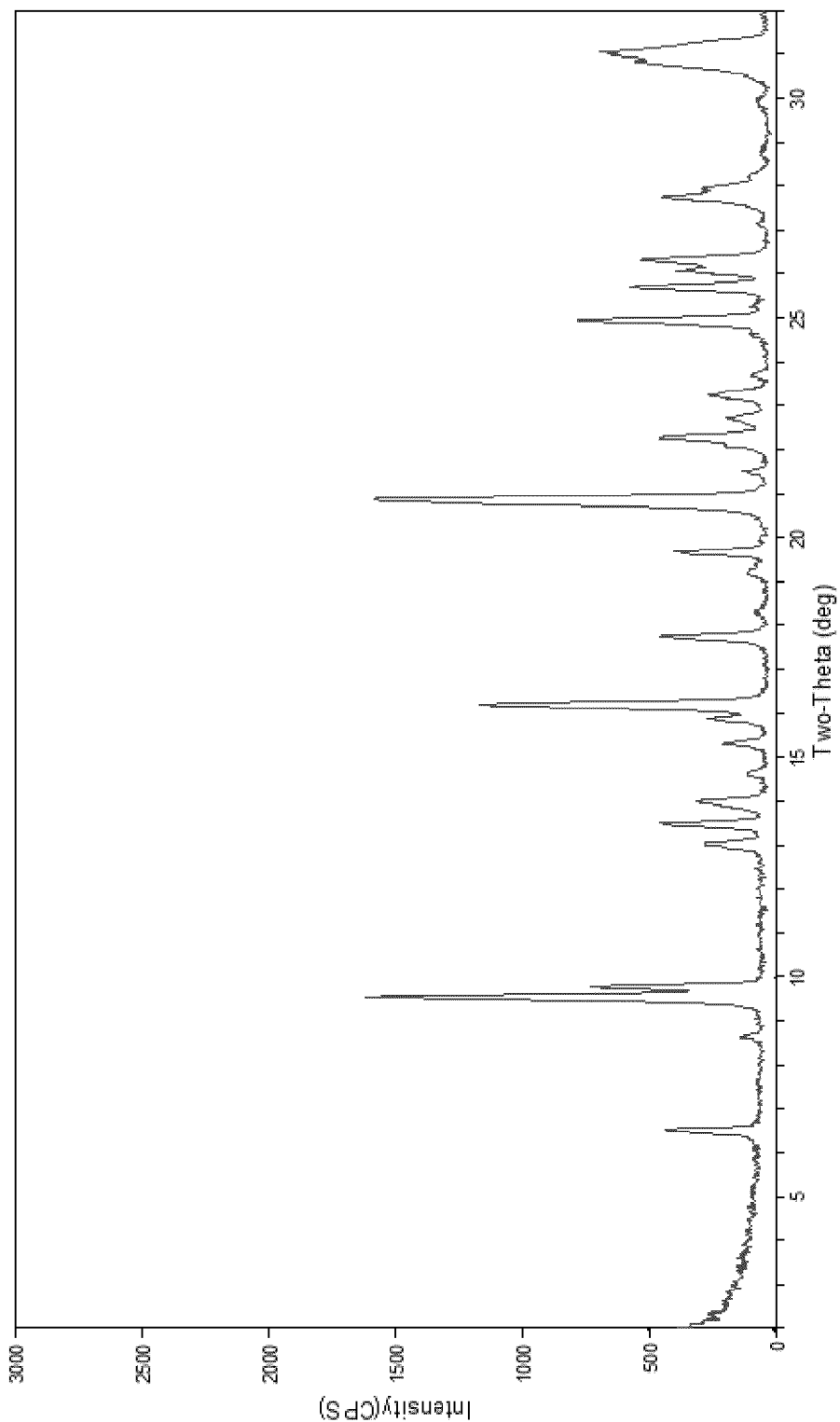
FIG. 1 shows a powder x-ray diffraction (XRD) pattern of the as-made molecular sieve prepared according to Example 10 of the present invention.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The term "molecular sieve" includes (a) intermediate and (b) final or target molecular sieves and zeolites produced by (1) direct synthesis or (2) post-crystallization treatment (secondary synthesis). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004.

The term "CHA-type molecular sieve" includes all molecular sieves and their isotypes that have been assigned the International Zeolite Associate framework code CHA, as described in the *Atlas of Zeolite Framework Types*, eds. Ch. Baerlocher, L. B. McCusker and D. H. Olson, Elsevier, 6$^{th}$ revised edition, 2007. The *Atlas of Zeolite Framework Types* classes several differently named materials as having this same CHA topology, including SSZ-13 and SSZ-62.

It will be understood by a person skilled in the art that the CHA-type molecular sieve materials made according to the process described herein may contain impurities, such as amorphous materials; unit cells having non-CHA framework topologies (e.g., MFI, MTW, MOR, Beta); and/or other impurities (e.g., heavy metals and/or organic hydrocarbons).

Where permitted, all publications, patents and patent applications cited in this application are herein incorporated by reference in their entirety; to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants are intended to be non-limiting, such that recitation of items in a list is not to the exclusion of other like items that may also be useful in the materials, compositions and methods of this invention.

The present invention is directed to a method of making CHA-type molecular sieves using an alkali metal silicate and a structure directing agent (SDA) selected from the group consisting of cations represented by structures (1) through (6), and mixtures thereof:

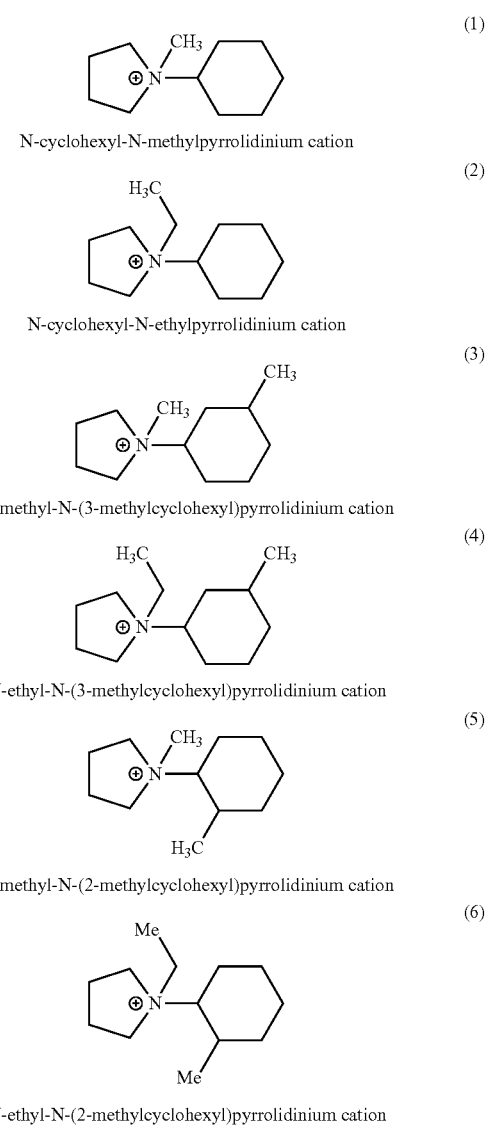

(1) N-cyclohexyl-N-methylpyrrolidinium cation (2) N-cyclohexyl-N-ethylpyrrolidinium cation (3) N-methyl-N-(3-methylcyclohexyl)pyrrolidinium cation (4) N-ethyl-N-(3-methylcyclohexyl)pyrrolidinium cation (5) N-methyl-N-(2-methylcyclohexyl)pyrrolidinium cation (6) N-ethyl-N-(2-methylcyclohexyl)pyrrolidinium cation Reaction Mixture In general, the CHA-type molecular sieve is prepared by:

(a) preparing a reaction mixture containing (1) an alkali metal silicate; (2) one or more sources of one or more oxides selected from the group consisting of oxides of trivalent elements, pentavalent elements, and mixtures thereof; (3) at least one source of an element selected from Groups 1 and 2 of the Periodic Table; (4) at least one structure directing agent selected from the group consisting of cations represented by structures (1) through (6) herein; (5) hydroxide ions; and (6) water; and (b) subjecting the reaction mixture to crystallization conditions sufficient to form crystals of the CHA-type molecular sieve.

Where the molecular sieve formed is an intermediate material, the process of the present invention includes a further step of synthesizing a target molecular sieve by post-synthesis techniques, such as heteroatom lattice substitution techniques and acid leaching.

The composition of the reaction mixture from which the CHA-type molecular sieve is formed, in terms of molar ratios, is identified in Table 1 below:

TABLE 1

| Reactants | Broad | Subembodiment |
| --- | --- | --- |
| $SiO_2/X_2O_a$ molar ratio | 10-300 | 20-100 |
| $M/SiO_2$ molar ratio | 0.01-1 | 0.2-0.6 |
| $Q/SiO_2$ molar ratio | 0.05-0.4 | 0.1-0.3 |
| $OH^-/SiO_2$ molar ratio | 0.1-1.0 | 0.2-0.7 |
| $H_2O/SiO_2$ molar ratio | 10-50 | 25-40 | wherein compositional variables X, M, Q and a are as described herein above.

The processes for making CHA-type molecular sieve described herein employ an alkali metal silicate as the $SiO_2$ source. Examples of an alkali metal silicate useful for making CHA-type molecular sieves using the structure directing agents described herein include sodium silicate and potassium silicate.

For each embodiment described herein, X is selected from the group consisting of elements from Groups 3-13 of the Periodic Table. In one subembodiment, X is selected from the group consisting of gallium (Ga), aluminum (Al), iron (Fe), boron (B), indium (In), and mixtures thereof. In another subembodiment, X is selected from the group consisting of Al, B, Fe, Ga, and mixtures thereof. In another subembodiment, X is selected from the group consisting of Al, Fe, Ga, and mixtures thereof. Sources of elements selected for optional composition variable X include oxides, hydroxides, acetates, oxalates, ammonium salts and sulfates of the element(s) selected for X. Typical sources of aluminum oxide include aluminates, alumina, and aluminum compounds such as $AlCl_3$, $Al_2(SO_4)_3$, aluminum hydroxide ($Al(OH)_3$), kaolin clays, and other zeolites. An example of the source of aluminum oxide is LZ-210, $NH_4$-Y62 zeolite, and Na-Y52 zeolite (various versions of Y zeolite). Boron, gallium, and iron can be added in forms corresponding to their aluminum and silicon counterparts.

As described herein above, for each embodiment described herein, the reaction mixture may be formed using at least one source of an element selected from Groups 1 and 2 of the Periodic Table (referred to herein as M). In one subembodiment, the reaction mixture is formed using a source of an element from Group 1 of the Periodic Table. In another subembodiment, the reaction mixture is formed using a source of sodium (Na). Any M-containing compound which is not detrimental to the crystallization process is suitable. Sources for such Groups 1 and 2 elements include oxides, hydroxides, nitrates, sulfates, halides, oxalates, citrates and acetates thereof.

The SDA cation is typically associated with anions ($X^-$) which may be any anion that is not detrimental to the formation of the zeolite. Representative anions include elements from Group 17 of the Periodic Table (e.g., fluoride, chloride, bromide and iodide), hydroxide, acetate, sulfate, tetrafluoroborate, carboxylate, and the like.

The reaction mixture can be prepared either batch wise or continuously. Crystal size, morphology and crystallization time of the molecular sieve described herein may vary with the nature of the reaction mixture and the crystallization conditions.

Crystallization and Post-Synthesis Treatment

In practice, the molecular sieve is prepared by:
(a) preparing a reaction mixture as described herein above; and
(b) maintaining the reaction mixture under crystallization conditions sufficient to form the molecular sieve. (See, Harry Robson, *Verified Syntheses of Zeolitic Materials*, $2^{nd}$ revised edition, Elsevier, Amsterdam (2001)).

The reaction mixture is maintained at an elevated temperature until the molecular sieve is formed. The hydrothermal crystallization is usually conducted under pressure, and usually in an autoclave so that the reaction mixture is subject to autogenous pressure, at a temperature between 130° C. and 200° C., for a period of one to six days.

The reaction mixture may be subjected to mild stirring or agitation during the crystallization step. It will be understood by a person skilled in the art that the molecular sieves described herein may contain impurities, such as amorphous materials, unit cells having framework topologies which do not coincide with the molecular sieve, and/or other impurities (e.g., organic hydrocarbons).

During the hydrothermal crystallization step, the molecular sieve crystals can be allowed to nucleate spontaneously from the reaction mixture. The use of crystals of the molecular sieve as seed material can be advantageous in decreasing the time necessary for complete crystallization to occur. In addition, seeding can lead to an increased purity of the product obtained by promoting the nucleation and/or formation of the molecular sieve over any undesired phases. When used as seeds, seed crystals are added in an amount between 1% and 10% of the weight of the source for compositional variable T used in the reaction mixture.

Once the molecular sieve crystals have formed, the solid product is separated from the reaction mixture by standard mechanical separation techniques such as filtration. The crystals are water-washed and then dried to obtain the as-synthesized molecular sieve crystals. The drying step can be performed at atmospheric pressure or under vacuum.

The molecular sieve can be used as-synthesized, but typically will be thermally treated (calcined). The term "as-synthesized" refers to the molecular sieve in its form after crystallization, prior to removal of the SDA. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the molecular sieve. The SDA can also be removed by photolysis techniques (e.g. exposing the SDA-containing molecular sieve product to light or electromagnetic radiation that has a wavelength shorter than visible light under conditions sufficient to selectively remove the organic compound from the molecular sieve) as described in U.S. Pat. No. 6,960, 327 to Navrotsky and Parikh, issued Nov. 1, 2005.

The molecular sieve can subsequently be calcined in steam, air or inert gas at temperatures ranging from about 200° C. to about 800° C. for periods of time ranging from 1 to 48 hours, or more. Usually, it is desirable to remove the extra-framework cation (e.g. $H^+$) by ion-exchange or other known method and replace it with hydrogen, ammonium, or any desired metal-ion.

Where the molecular sieve formed is an intermediate material, the target molecular sieve can be achieved using post-synthesis techniques such as heteroatom lattice substitution techniques. The target molecular sieve (e.g. silicate SSZ-13) can also be achieved by removing heteroatoms from the lattice by known techniques such as acid leaching.

The molecular sieve made from the process of the present invention can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

Characterization of the Molecular Sieve

The CHA molecular sieves made by the process of the present invention have a composition, as-synthesized and in the anhydrous state, as described in Table 2 (in terms of mole ratios):

TABLE 2

|  | Broadest | Secondary |
|---|---|---|
| $SiO_2/X_2O_a$ | 10-300 | 20-100 |
| $Q/SiO_2$ | 0.05-0.4 | 0.1-0.2 |
| $M/SiO_2$ | 0.01-1 | 0.2-0.6 | wherein compositional variables X, M, Q and a are as described herein above.

The CHA-type molecular sieves synthesized by the process of the present invention are characterized by their X-ray diffraction pattern (XRD). X-ray diffraction patterns representative of CHA-type molecular sieves can be referenced in M. M. J. Treacy et al., *Collection of Simulated XRD Powder Patterns for Zeolites*, 5th Revised Edition, 2007 of the International Zeolite Association. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Si/Al mole ratio from sample to sample. Calcination can also cause minor shifts in the X-ray diffraction pattern. Notwithstanding these minor perturbations, the basic crystal lattice structure remains unchanged.

The powder X-ray diffraction patterns presented herein were collected by standard techniques. The radiation was CuK-α radiation. The peak heights and the positions, as a function of 2θ where θ is the Bragg angle, were read from the relative intensities of the peaks, and d, the interplanar spacing in Angstroms corresponding to the recorded lines, can be calculated.

EXAMPLES

The following examples demonstrate but do not limit the present invention.

Example 1

Synthesis of Cyclohexylpyrrolidine

Cyclohexylpyrrolidine was prepared as described in the procedure below. In a 3-neck reaction flask equipped with a mechanical stirrer and heating mantle, a 2 molar equivalent of pyrrolidine were mixed with 1 molar equivalent of cyclohexanone in dry cyclohexane to make a 1M solution with respect to the cyclohexanone. To the mixture, 2 molar equivalents of anhydrous $MgSO_4$ (as dehydrating agent) were added. The resulting mixture was refluxed for 94 hours. The progress of the reaction was monitored by NMR analysis.

After heating for 96 hours, the reaction was completed and reaction mixture was cooled down, filtered and concentrated on a rotary evaporator to remove excess pyrrolidine and cyclohexanone. The obtained oil was dissolved in cyclohexane and hydrogenated at 60 psi hydrogen pressure in the presence of 10% palladium on activated carbon (10 mol % with respect the produced cyclohexenylpyrrolidine) on a hydrogenation Parr. The reaction was left to gently shake overnight. Once hydrogenation is complete, the reaction mixture was filtered through a fritted glass funnel and the filtrate was concentrated on a rotary evaporator to remove the solvent (cyclohexane). The desired cyclohexanylpyrrolidine was obtained in 91% yield as colorless oil.

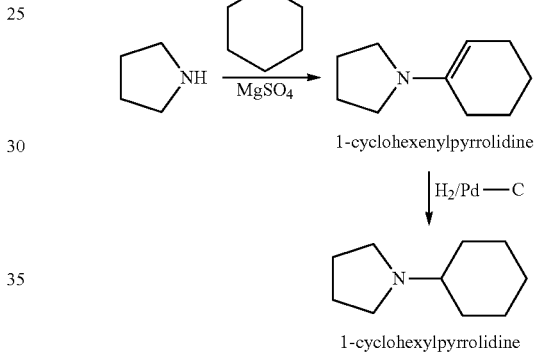

In some instances when some unreacted cyclohexanone is still in the reaction mixture, the product after hydrogenation was purified by adding 3M HCl solution to the mixture (after filtering out the palladium/carbon catalyst) and left to stir for 15-20 minutes. The resulting mixture is then extracted with diethyl ether to remove the cyclohexanone from the mixture and leaving behind the cyclohexylpyrrolidinium hydrochloride salt. The water layer containing cyclohexylpyrrolidinium hydrochloride salt is separated and then neutralized with NaOH solution to a pH of 9-10. The free cyclohexylpyrrolidine is extracted with ethyl acetate, dried over $MgSO_4$ and concentrated on a rotary evaporator at reduced pressure to give the desired product free from any impurities.

Example 2

Synthesis of N-(3-methylcyclohexyl)pyrrolidine

N-(3-methylcyclohexyl)pyrrolidine was synthesized using the procedure described in example 1 above using 3-methylcyclohexanone in place of cyclohexanone. The condensation reaction yields an isomeric mixture of N-(3-methylcyclohex-1-enyl)pyrrolidine and N-(5-methylcyclohex-1-enyl)pyrrolidine which upon hydrogenation yielded the desired a N-(3-methylcyclohexyl)pyrrolidine in 88% yield as colorless oil.

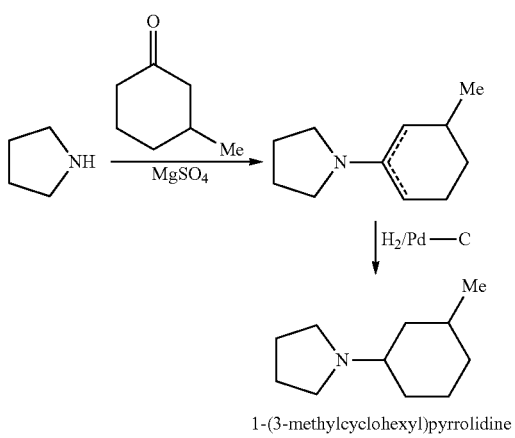

1-(3-methylcyclohexyl)pyrrolidine

Example 3

Synthesis of N-(2-methylcyclohexyl)pyrrolidine

Using the same procedure describes in example 1 above, N-(2-methylcyclohexyl)pyrrolidine was synthesized by replacing cyclohexanone with 2-methylcyclohexanone. The condensation reaction yielded an mixture of N-(2-methylcyclohexyl-1-enyl)pyrrolidine and N-(6-methylcyclohex-1-enyl)pyrrolidine which upon hydrogenation yielded the desired N-(2-methylcyclohexyl)pyrrolidine in 85% as colorless oil.

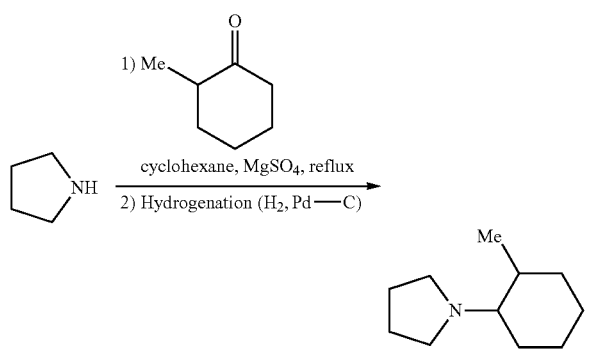

Example 4

Synthesis of N-Methyl-N-Cyclohexylpyrrolidinium Hydroxide

N-cyclohexylpyrrolidine prepared in Example 1 (1 molar equivalent) was dissolved in methanol to 0.5M concentration in a three neck reaction flask equipped with a mechanical stirrer and reflux condenser. To the methanolic solution of cyclohexylpyrrolidine, 2 molar equivalents of methyl iodide were added, and the resulting mixture was left to stir overnight. The mixture was heated to reflux and left to stir at reflux for 4 hours. The reaction was cooled down and left to stir overnight. The reaction was complete. The reaction mixture was concentrated on a rotary evaporator. The resulting tan-colored solids were dissolved in isopropyl alcohol and then precipitated out from solution by adding diethyl ether. The precipitate was filtered out and dried on a rotary evaporator at reduced pressure and in hot water bath at 80° C. to give the desired N-methyl-N-cyclohexylpyrrolidinium iodide in 86% yield. N-Methyl-N-cyclohexylpyrrolidinium iodide was converted to the hydroxide by ion-exchanging the iodide ion with hydroxide ion. In a polyethylene plastic bottle, N-methyl-N-cyclohexylpyrrolidinium iodide salt was dissolved in deionized water (1 mmol salt/10 ml $H_2O$). Then Bio-Rad AG 1-X8 resin (1.1 g resin/mmol salt) was added and the slurry-like mixture was gently stirred overnight. The exchange solution was then filtered and a small aliquot was titrated with 0.1N HCl to give 92% yield of the N-methyl-N-cyclohexylpyrrolidinium hydroxide.

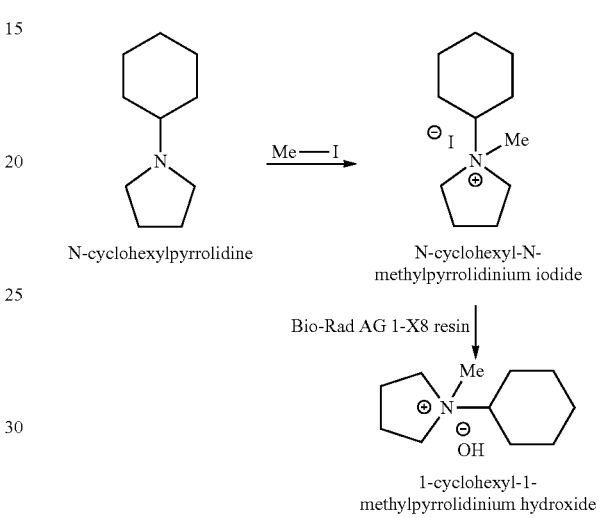

Example 5

Synthesis of N-Ethyl-N-Cyclohexylpyrrolidinium Hydroxide

N-cyclohexylpyrrolidine prepared in example 1 was quaternized with ethyl iodide according to the procedure describe in example 4 (using ethyl iodide in place of methyl iodide). The reaction afforded N-Ethyl-N-cyclohexylpyrrolidinium iodide in 86% yield. The iodide salt was exchanged with Bio-Rad AG 1-X8 ion-exchange resin as described in example 4 for the N-methyl-N-cyclohexylpyrrolidinium iodide. The exchange procedure afforded N-ethyl-N-cyclohexylpyrrolidinium hydroxide in 89% yield (titration analysis).

Example 6

Synthesis of N-Methyl-N-(3-methylcyclohexyl)pyrrolidinium Hydroxide

N-(3-methylcyclohexyl)pyrrolidine prepared in example 2 above was quaternized with methyl iodide in a similar fashion to the procedure described in example 4. The quaternization afforded the desired N-methyl-N-(3-methylcyclohexyl)pyrrolidinium iodide in 94% yield. The resulting iodide salt was exchanged with Bio-Rad AG 1-X8 ion-exchange resin as described in example 4 to give N-methyl-N-(3-methylcyclohexyl)pyrrolidinium hydroxide in 98% yield (titration analysis).

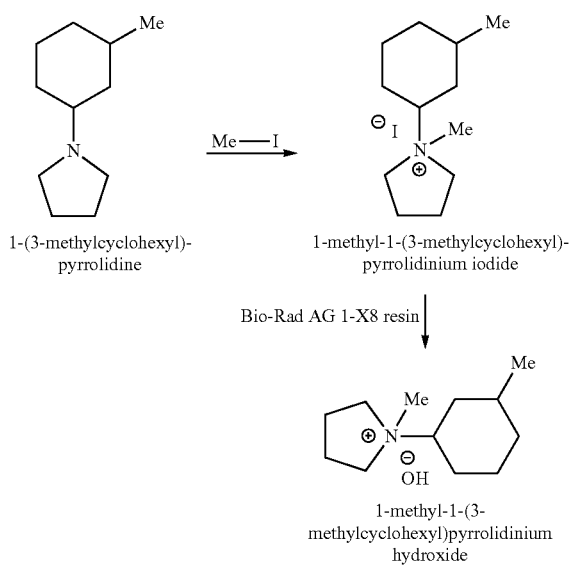

Example 7

Synthesis of N-Ethyl-N-(3-methylcyclohexyl)pyrrolidinium Hydroxide

N-(3-methylcyclohexyl)pyrrolidine prepared in example 2 above was quaternized with ethyl iodide in a similar fashion to the procedure described in example 6 with the exception of using ethyl iodide in place of methyl iodide. The quaternization afforded the desired N-ethyl-N-(3-methylcyclohexyl)pyrrolidinium iodide in 85% yield. The resulting N-ethyl-N-(3-methylcyclohexyl)pyrrolidinium iodide salt was exchanged with Bio-Rad AG 1-X8 ion-exchange resin as described in example 4 to give N-methyl-N-(3-methylcyclohexyl)pyrrolidinium hydroxide in 88% yield (by titration).

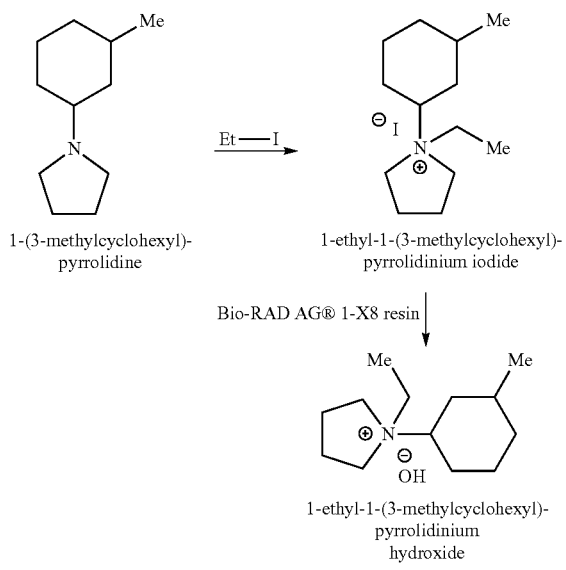

Example 8

Synthesis of N-methyl-N-(2-methylcyclohexyl)pyrrolidinium hydroxide

N-(2-methylcyclohexyl)pyrrolidine as synthesized in Example 3 above, was quaternized with methyl iodide using the procedure described in example 4 with the exception of using N-(2-methylcyclohexyl)pyrrolidine in place of N-cyclohexylpyrrolidine. The quaternization procedure afforded the desired N-methyl-N-(2-methylcyclohexyl)pyrrolidinium iodide in 94% yield as an off-white solid. This N-methyl-N-(2-methylcyclohexyl)pyrrolidinium iodide was ion-exchanged with BIO-RAD AGR 1-X* resin as described in example 4 above. The ion-exchange procedure afforded the hydroxide solution of N-methyl-N-(2-methylcyclohexyl)pyrrolidinium cation in 91% yield as determined by titration analysis on a small aliquot.

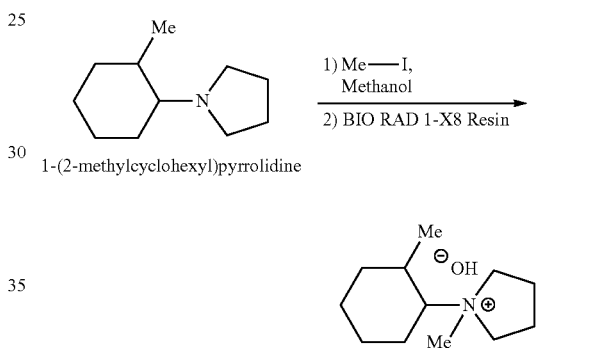

Example 9

Synthesis of N-Ethyl-N-(2-methylcyclohexyl)pyrrolidinium Hydroxide

Using the same procedure described in examples 4 and 9 above, N-(2-methylcyclohexyl)pyrrolidine was quaternized with ethyl iodide to give N-ethyl-N-(2-methylcyclohexyl)pyrrolidinium iodide which ion-exchanged with hydroxide ion using the aforementioned exchange procedures to give the hydroxide solution of the N-ethyl-N-(2-methylcyclohexyl)pyrrolidinium in a combined yield 86% for both the quaternization and the exchange.

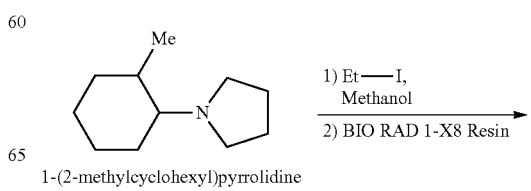

-continued

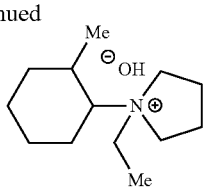

1-ethyl-1-(2-methylcyclohexyl)pyrrolidinium

Example 10

Synthesis of Al-SSZ-13 (Al-CHA)

In a 23 CC Teflon liner, 3.6 g of 0.63M of N-cyclohexyl-N-methylpyrrolidinium hydroxide solution (2 mmol SDA), 0.2 g of 1N NaOH solution, 2.7 g sodium silicate, and 0.26 g $NH_4$—Y (Y-62) zeolite were all mixed and thoroughly stirred until a homogenous mixture was obtained. The Teflon liner containing the mixture was capped and sealed in a Parr autoclave and heated in an oven at 150° C. while rotating at ~43 rpm. The crystallization progress was followed by Scanning Electron Microscopy analysis and by monitoring the pH of the reaction solution. The reaction was completed after heating for 6 days to give a clear solution and a fine powder precipitate with a pH of 12.6. The reaction solution was filtered using a fritted glass funnel. The obtained solids were thoroughly rinsed with deionized water (1 liter) and were air-dried overnight. Then, the solids were further dried in an oven at 125° C. for 2 hr. The reaction yielded 0.53 g of SSZ-13 (CHA) and Mordenite (MOR) zeolites. The reaction usually leads to equal amounts of the two phases and occasionally CHA is produced as the dominant phase. The reaction product was analyzed by powder XRD, and the resulting XRD pattern for the as-made product is shown in FIG. 1.

Figure 2:
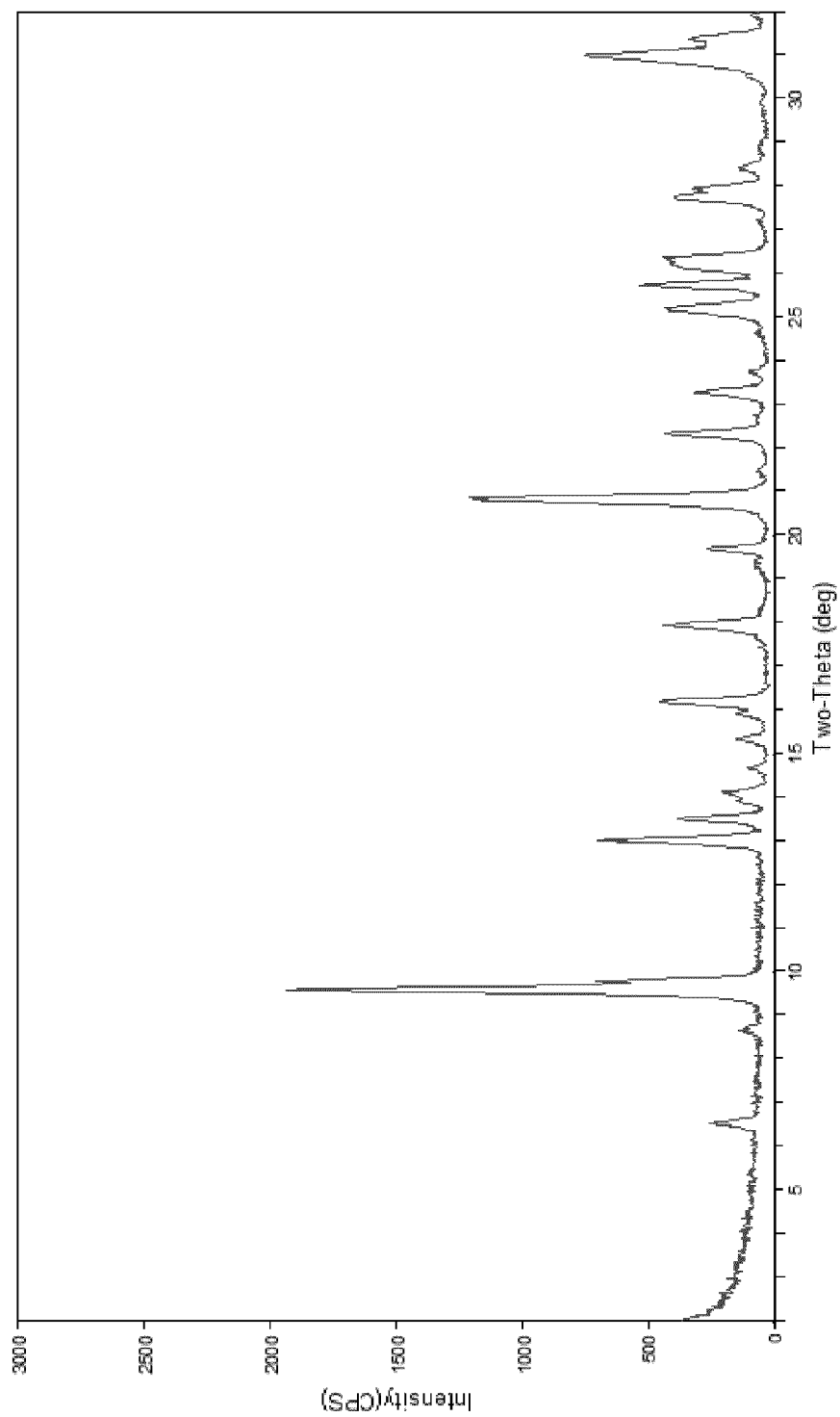
FIG. 2 shows a powder XRD pattern of the calcined molecular sieve prepared according to Example 10 of the present invention.

The as-made product was calcined in air in a muffle furnace oven from room temperature to 120° C. at a rate of 1° C./minute and held at 120° C. for 2 hours. The temperature was then ramped up to 540° C. at a rate of 1° C./minute. The sample was held at 540° C. for 5 hrs. The temperature was increased at the same rate (1° C./min) to 595° C. and held there for 5 hrs. The resulting XRD pattern for the calcined product is shown in FIG. 2.

Example 11

Example 10 was repeated but 4.6 g of 0.45M of N-ethyl-N-cyclohexylpyrrolidinium hydroxide solution was used instead of N-methyl-N-cyclohexylpyrrolidinium hydroxide solution. The reaction was complete in 6 days to give 0.51 g of CHA (SSZ-13) with occasional trace amount of MOR (Mordenite) impurity.

Figure 3:
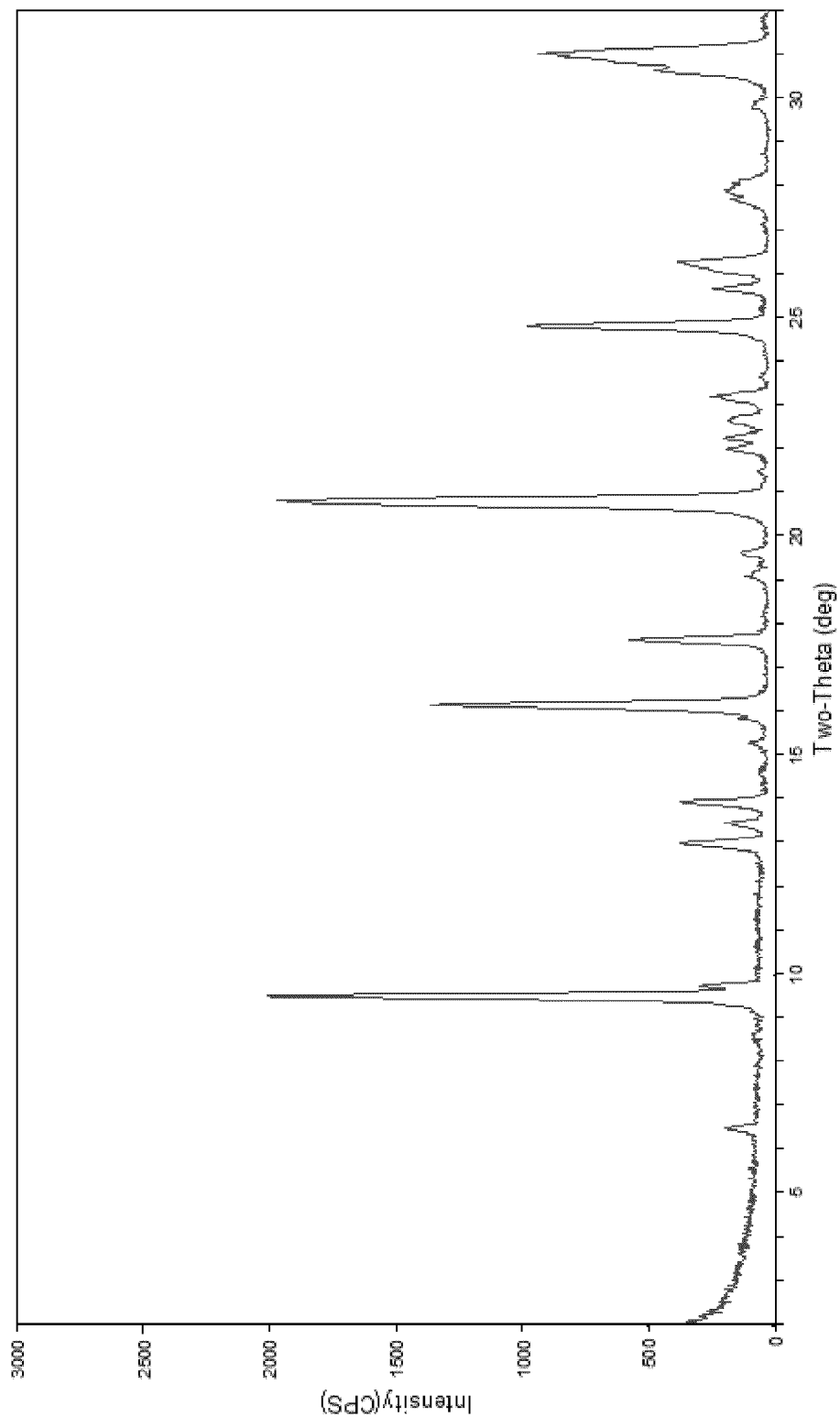
FIG. 3 shows a powder XRD pattern of the as-made molecular sieve prepared according to Example 11 of the present invention.
Figure 4:
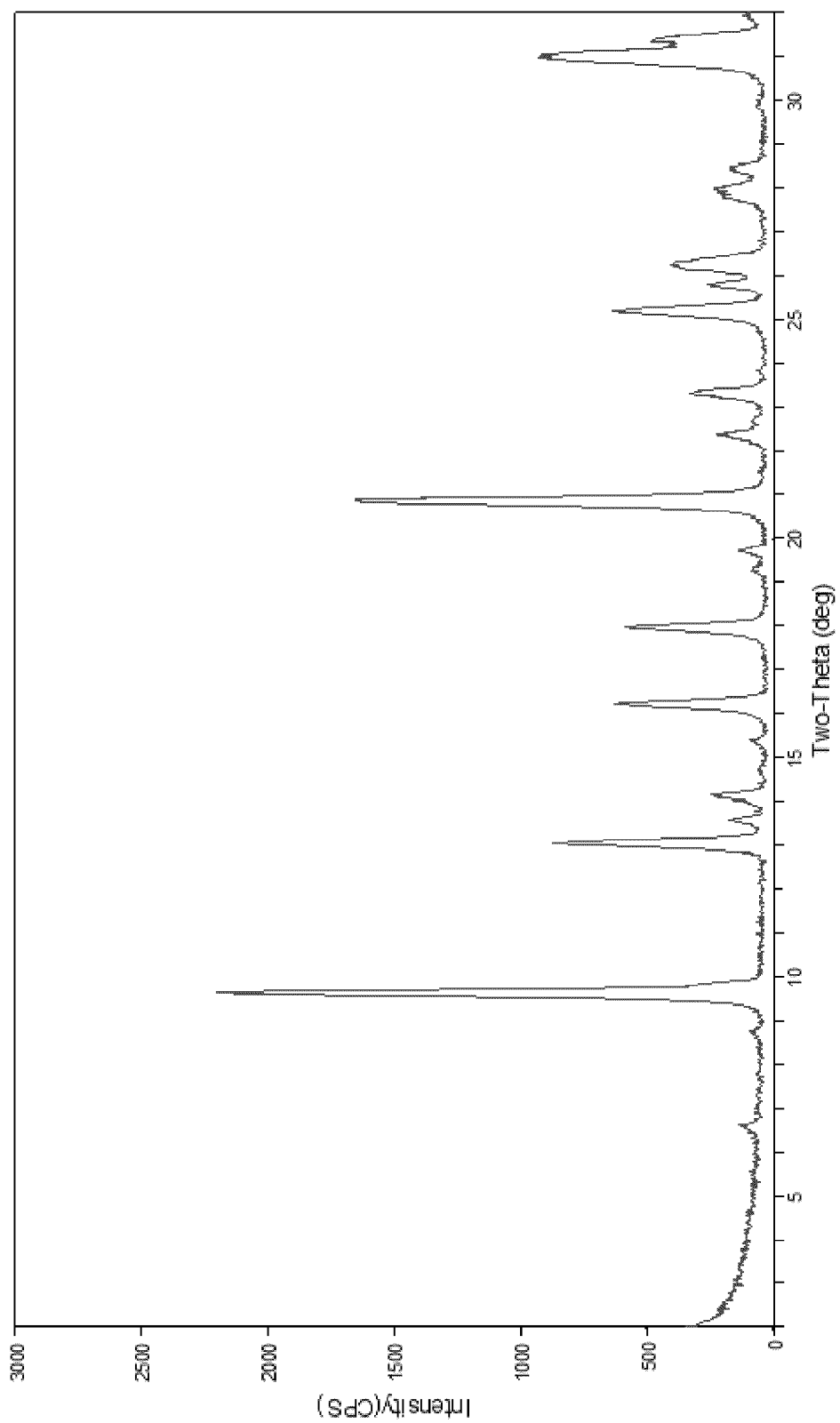
FIG. 4 shows a powder XRD pattern of the calcined molecular sieve prepared according to Example 11 of the present invention.

The reaction product was analyzed by powder XRD, and the resulting XRD pattern for the as-made product is shown in FIG. 3. The as-made product was calcined per the technique described in Example 10 and analyzed by powder XRD. The resulting XRD pattern for the calcined product is shown in FIG. 4.

Example 12

Example 10 was repeated but N-methyl-N-cyclohexylpyrrolidinium hydroxide was replaced with 3.3 g of 0.69M of N-methyl-N-(3-methylcyclohexyl)pyrrolidinium hydroxide solution. The reaction was done in 6 days and yielded 0.54 g of a mixture of mostly CHA and little amount of MOR.

Figure 5:
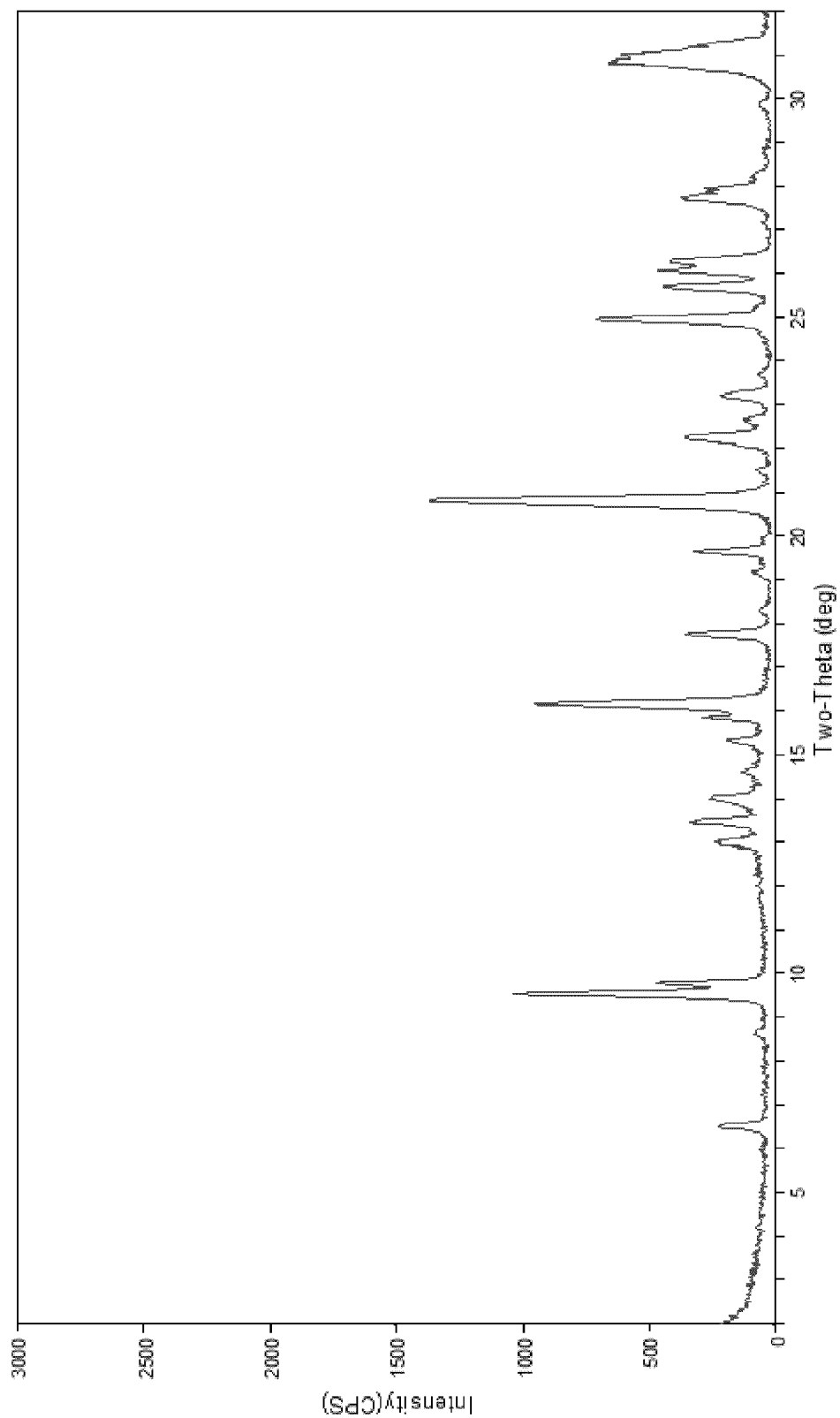
FIG. 5 shows a powder XRD pattern of the as-made molecular sieve prepared according to Example 12 of the present invention.
Figure 6:
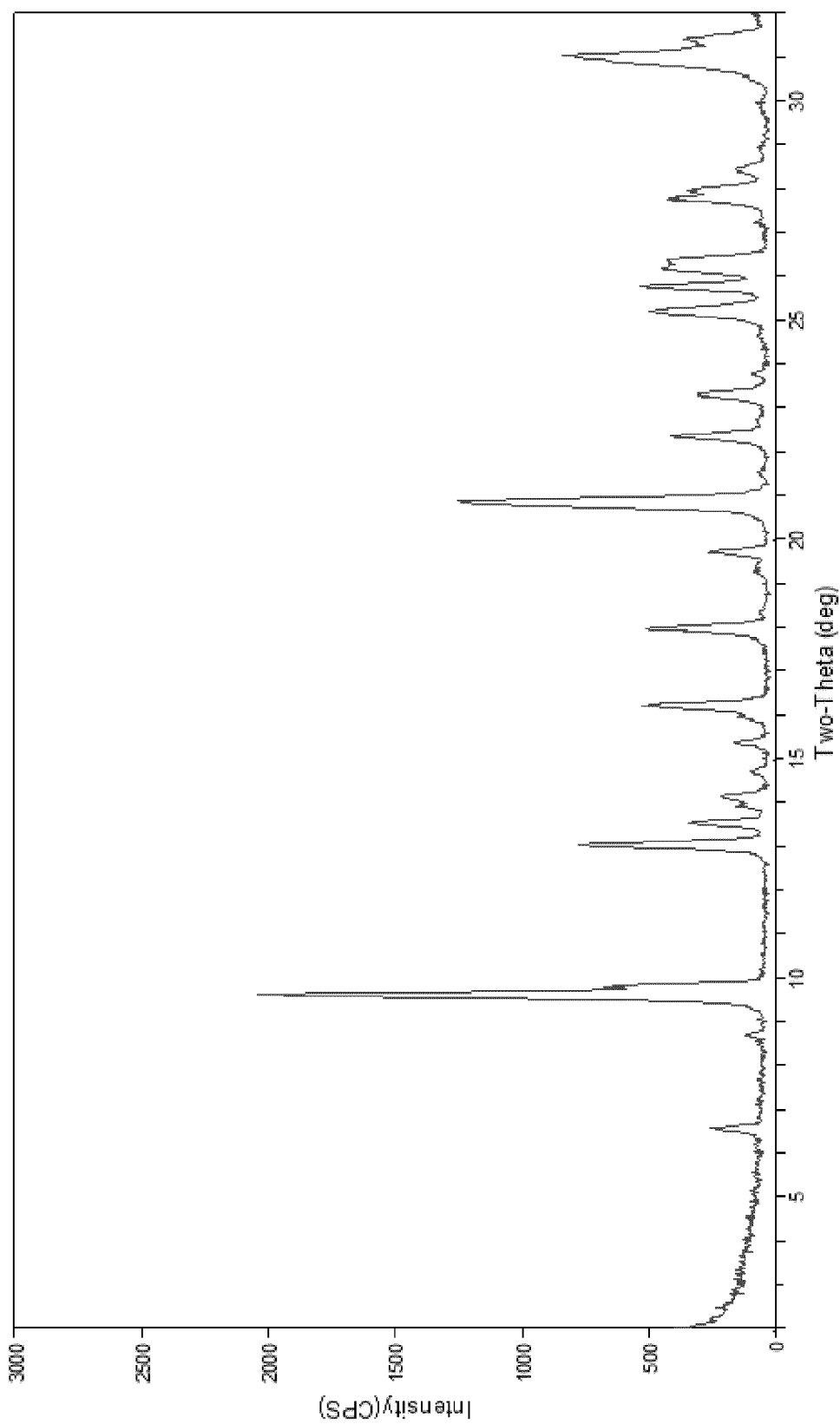
FIG. 6 shows a powder XRD pattern of the calcined molecular sieve prepared according to Example 12 of the present invention.

The reaction product was analyzed by powder XRD, and the resulting XRD pattern for the as-made product is shown in FIG. 5. The as-made product was calcined per the technique described in Example 10 and analyzed by powder XRD. The resulting XRD pattern for the calcined product is shown in FIG. 6.

Example 13

Example 12 was repeated with 3.3 g of 0.68 molar solution of N-ethyl-N-(3-methylcyclohexyl)pyrrolidinium hydroxide as the SDA. The reaction was complete in 6 days and provided 0.52 g of CHA with trace amount of MOR (Mordenite).

Figure 7:
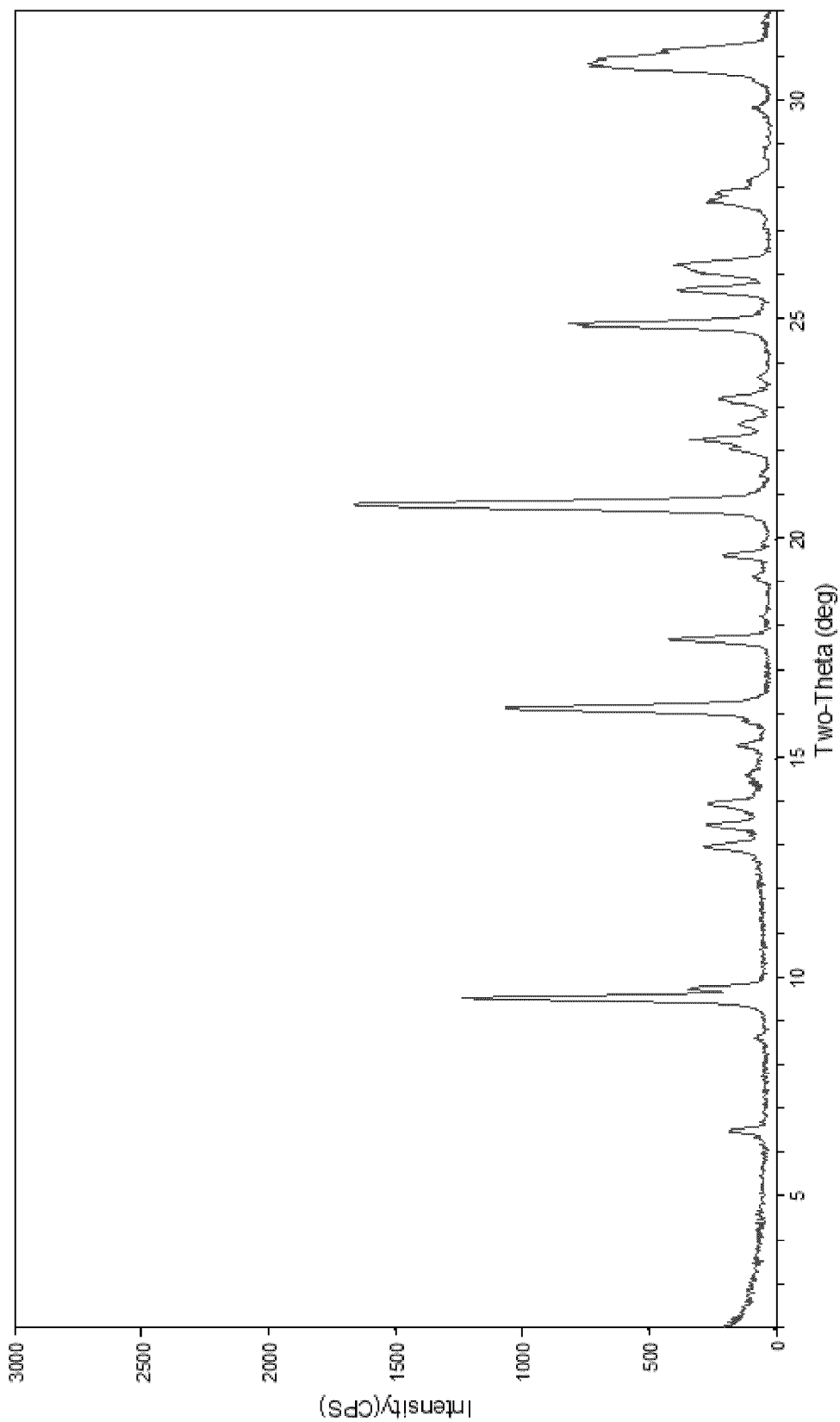
FIG. 7 shows a powder XRD pattern of the as-made molecular sieve prepared according to Example 13 of the present invention.
Figure 8:
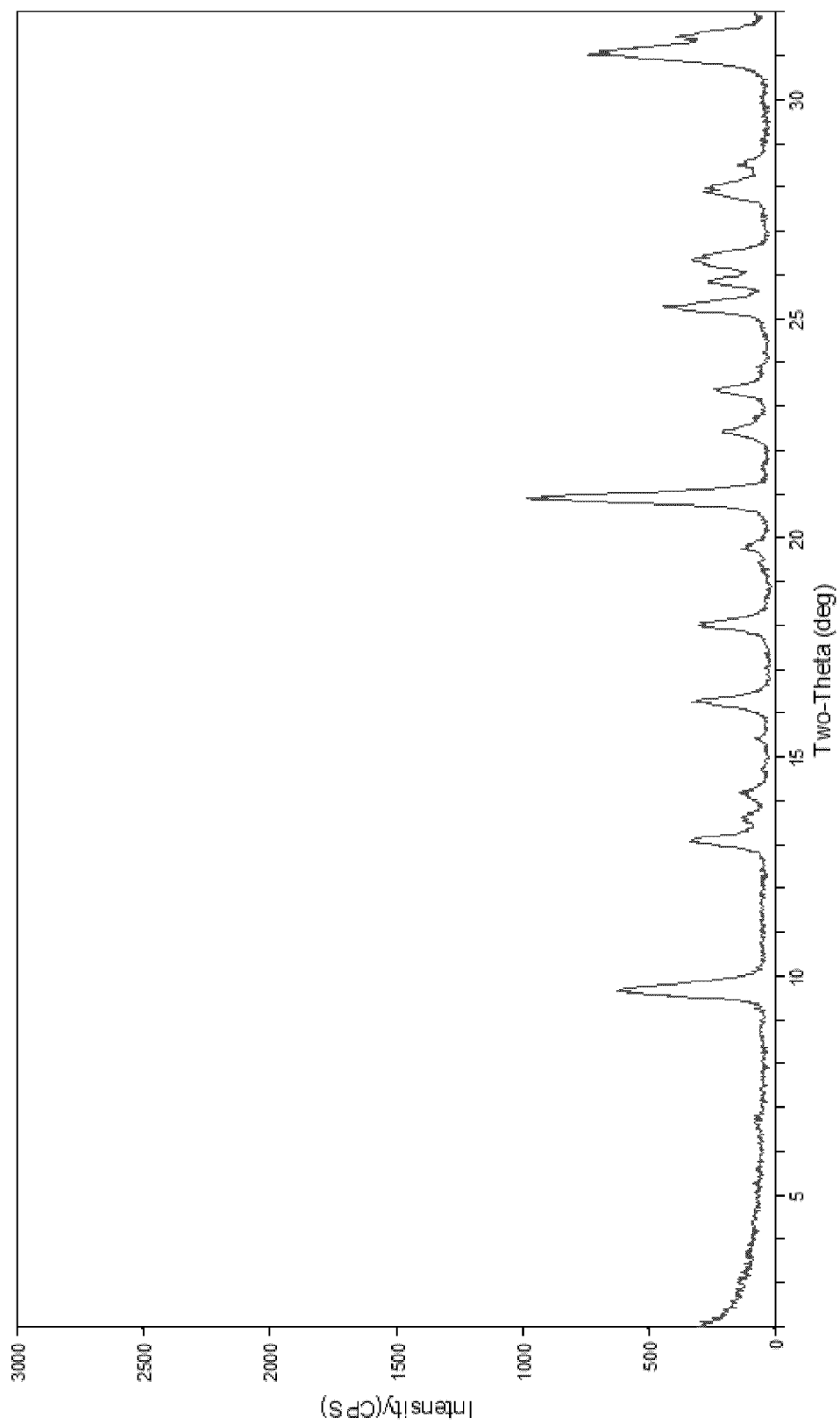
FIG. 8 shows a powder XRD pattern of the calcined molecular sieve prepared according to Example 13 of the present invention.

The reaction product was analyzed by powder XRD, and the resulting XRD pattern for the as-made product is shown in FIG. 7. The as-made product was calcined per the technique described in Example 10 and analyzed by powder XRD. The resulting XRD pattern for the calcined product is shown in FIG. 8.

Example 14

Example 10 was repeated but a 3.1 gm of 0.64M solution of N-methyl-N-(2-methylcyclohexyl)pyrrolidinium hydroxide in place N-methyl-N-cyclohexylpyrrolidinium hydroxide. The reaction heated for 6 days to give 0.48 g of both CHA and MOR in about equal amounts.

Figure 9:
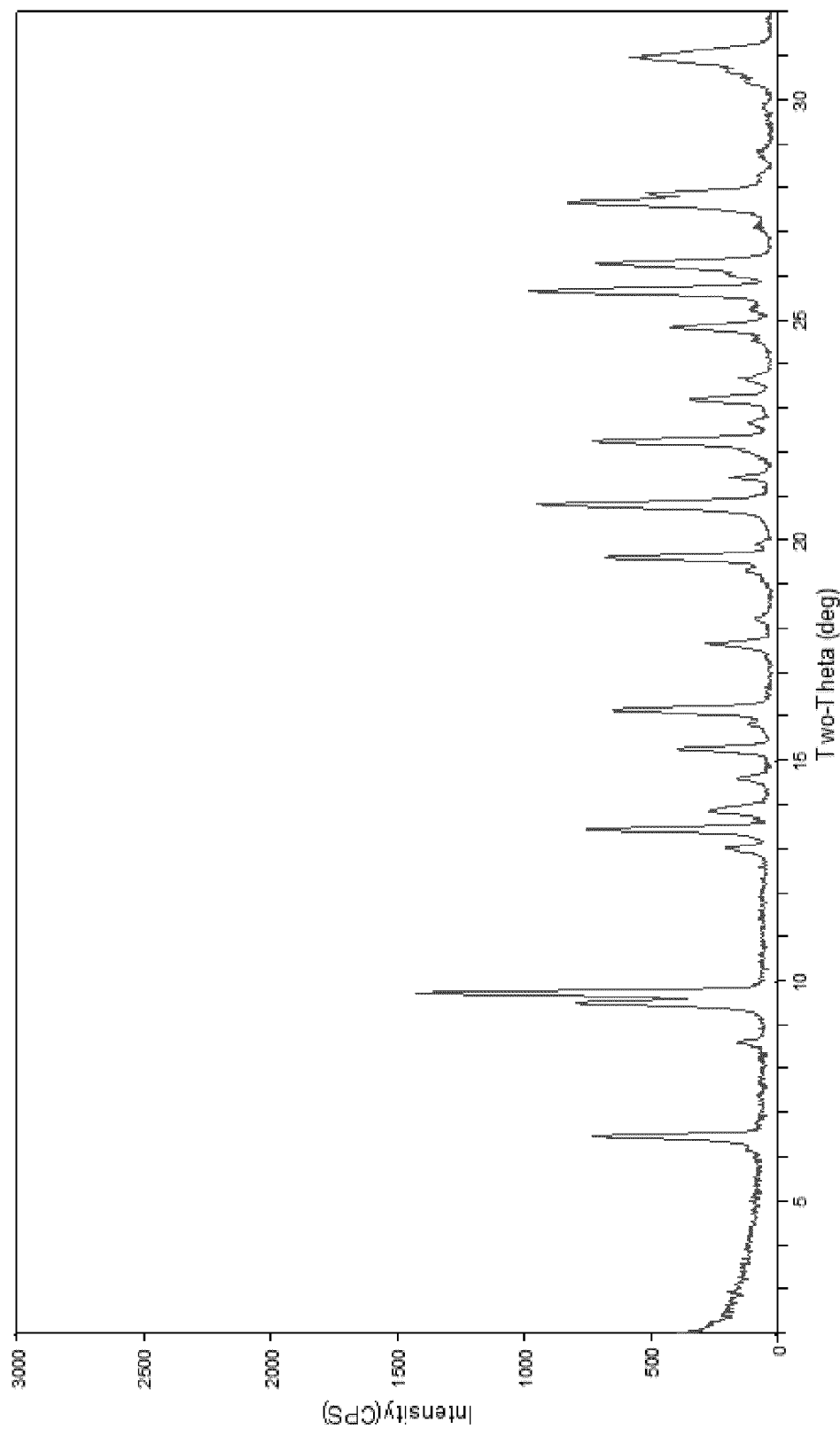
FIG. 9 shows a powder XRD pattern of the as-made molecular sieve prepared according to Example 14 of the present invention.
Figure 10:
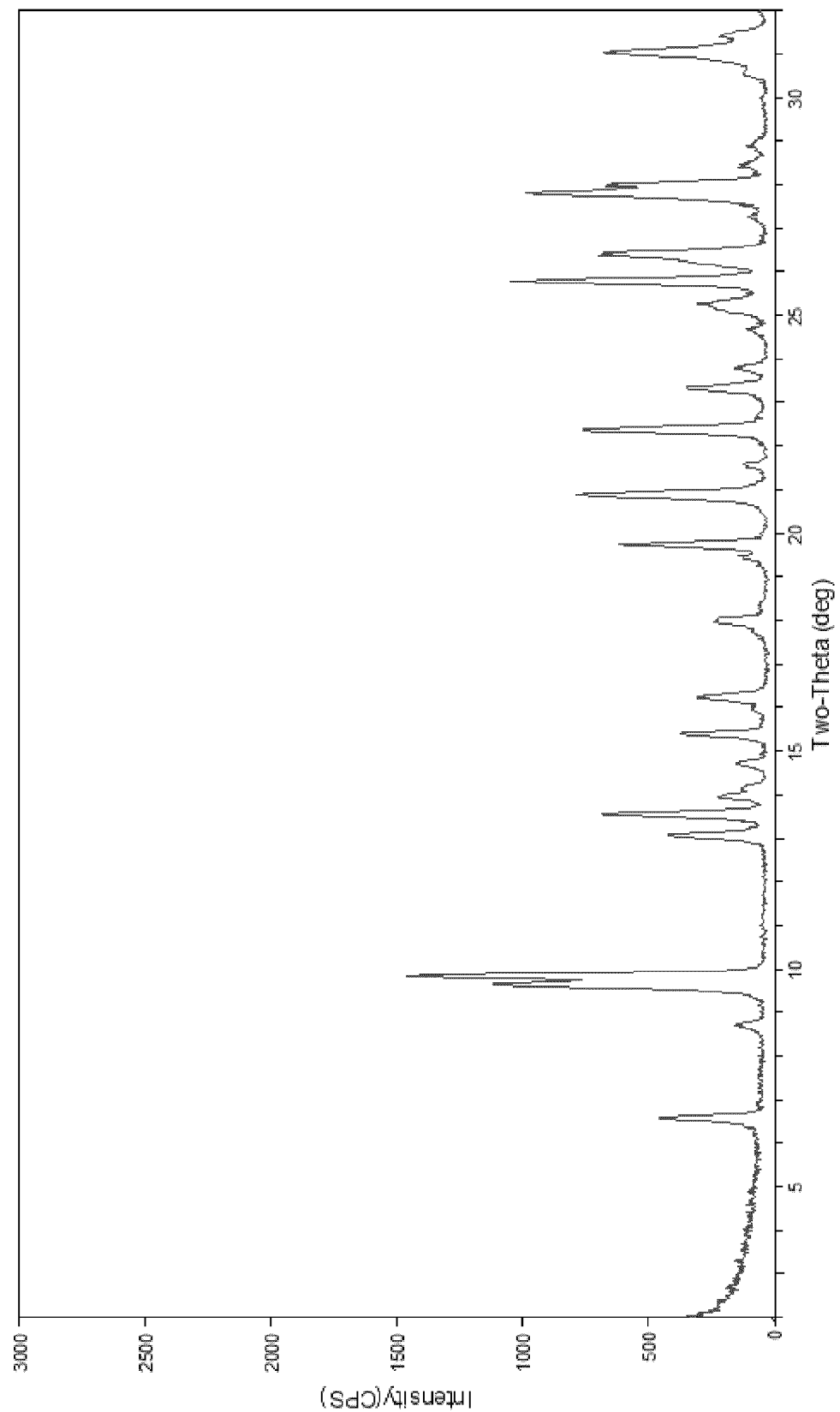
FIG. 10 shows a powder XRD pattern of the calcined molecular sieve prepared according to Example 14 of the present invention.

The reaction product was analyzed by powder XRD, and the resulting XRD pattern for the as-made product is shown in FIG. 9. The as-made product was calcined per the technique described in Example 10 and analyzed by powder XRD. The resulting XRD pattern for the calcined product is shown in FIG. 10.

Example 15

Example 14 was repeated but a 3.3 gm of 0.62M solution of N-ethyl-N-(2-methylcyclohexyl)pyrrolidinium hydroxide in place N-methyl-N-cyclohexylpyrrolidinium hydroxide. The reaction heated for 6 days to give 0.50 g of mostly CHA and little MOR.

Figure 11:
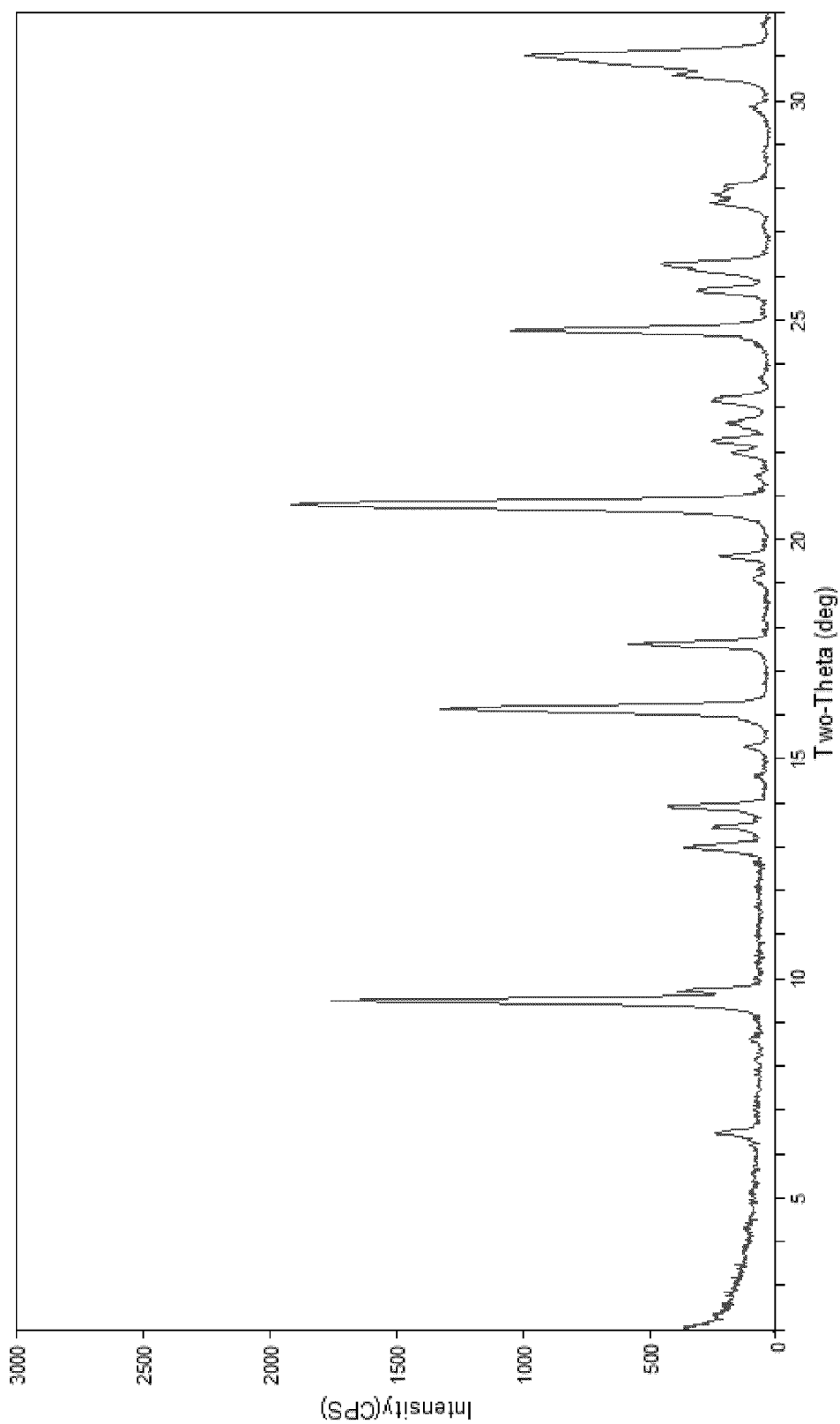
FIG. 11 shows a powder XRD pattern of the as-made molecular sieve prepared according to Example 15 of the present invention.
Figure 12:
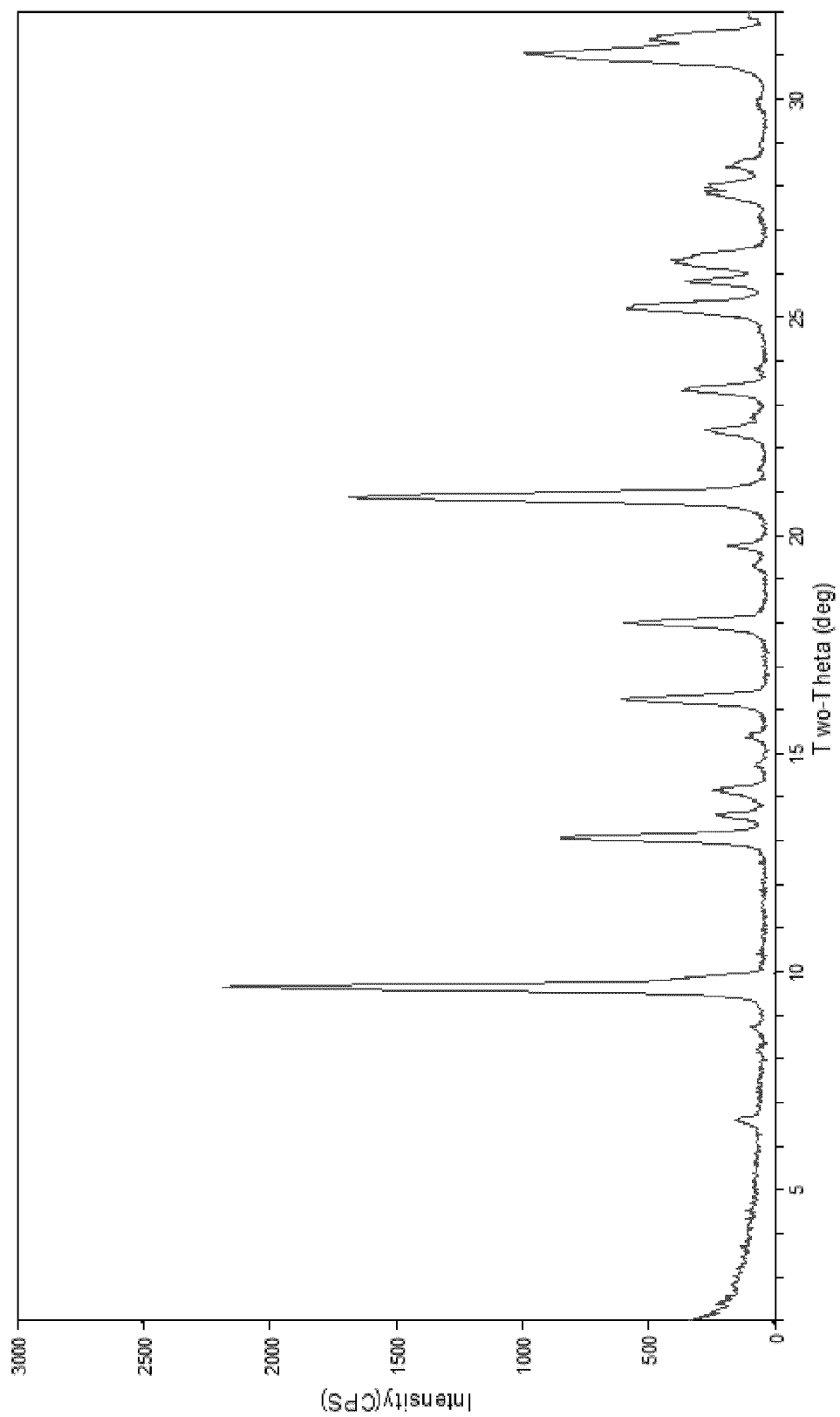
FIG. 12 shows a powder XRD pattern of the calcined molecular sieve prepared according to Example 15 of the present invention.

The reaction product was analyzed by powder XRD, and the resulting XRD pattern for the as-made product is shown in FIG. 11. The as-made product was calcined per the technique described in Example 10 and analyzed by powder XRD. The resulting XRD pattern for the calcined product is shown in FIG. 12.

What is claimed is:
1. A method of preparing a CHA-type molecular sieve, comprising:
 (a) preparing a reaction mixture containing: (1) an alkali metal silicate; (2) one or more sources of one or more oxides selected from the group consisting of oxides of trivalent elements, pentavalent elements, and mixtures thereof; (3) a cationic structure directing agent selected from the group consisting of N-cyclohexyl-N-methylpyrrolidinium, N-cyclohexyl-N-ethylpyrrolidinium, N-methyl-N-(3-methylcyclohexyl)pyrrolidinium, N-ethyl-N-(3-methylcyclohexyl)pyrrolidinium, N-methyl-N-(2-methylcyclohexyl)pyrrolidinium, N-ethyl-N-(2-methylcyclohexyl)pyrrolidinium, and mixtures thereof; (4) at least one source of an element selected from Groups 1 and 2 of the Periodic Table; (5) hydroxide ions; and (6) water; and
 (b) subjecting the reaction mixture to crystallization conditions sufficient to form crystals of the CHA-type molecular sieve.

2. The method of claim 1, wherein the CHA-type molecular sieve is prepared from a reaction mixture comprising, in terms of mole ratios, the following:

| | |
|---|---|
| $SiO_2/X_2O_a$ | 10-300 |
| $M/SiO_2$ | 0.01-1 |
| $Q/SiO_2$ | 0.05-0.4 |
| $OH^-/SiO_2$ | 0.1-1.0 |
| $H_2O/SiO_2$ | 10-50 | wherein:
(1) X is selected from the group consisting of trivalent and pentavalent elements from Groups 3-13 of the Periodic Table, and mixtures thereof;
(2) stoichiometric variable a equals the valence state of compositional variable X (e.g. when X is trivalent, a=3; when X is pentavalent, a=5);
(3) M is selected from the group consisting of elements from Groups 1 and 2 of the Periodic Table; and
(4) Q is the cationic structure directing agent.

3. The method of claim 2, wherein the CHA-type molecular sieve has a composition comprising, in terms of mole ratios, the following:

| | |
|---|---|
| $SiO_2/X_2O_a$ | 10-300 |
| $Q/SiO_2$ | 0.05-0.4 |
| $M/SiO_2$ | 0.01-1. |

4. The method of claim 3, wherein X is selected from the group consisting of Ga, Al, Fe, B, In, and mixtures thereof.

5. The method of claim 2, wherein X is selected from the group consisting of Ga, Al, Fe, B, In, and mixtures thereof.

6. The method of claim 2, wherein the CHA-type molecular sieve has a composition comprising, in terms of mole ratios, the following:

| | |
|---|---|
| $SiO_2/X_2O_a$ | 20-100 |
| $Q/SiO_2$ | 0.1-0.2 |
| $M/SiO_2$ | 0.2-0.6. |

7. The method of claim 6, wherein X is selected from the group consisting of Ga, Al, Fe, B, In, and mixtures thereof.

8. The method of claim 1, wherein the CHA-type molecular sieve has a composition, as made and in an anhydrous state, comprising, in terms of mole ratios, the following:

| | |
|---|---|
| $SiO_2/X_2O_a$ | 10-300 |
| $Q/SiO_2$ | 0.05-0.4 |
| $M/SiO_2$ | 0.01-1 | wherein:
(1) X is selected from the group consisting of trivalent and pentavalent elements from Groups 3-13 of the Periodic Table, and mixtures thereof;
(2) stoichiometric variable a equals the valence state of compositional variable X (e.g. when X is trivalent, a=3; when X is pentavalent, a=5);
(3) M is selected from the group consisting of elements from Groups 1 and 2 of the Periodic Table; and
(4) Q is the cationic structure directing agent.

9. The method of claim 8, wherein X is selected from the group consisting of Ga, Al, Fe, B, In, and mixtures thereof.

10. The method of claim 1, wherein the CHA-type molecular sieve has a composition comprising, in terms of mole ratios, the following:

| | |
|---|---|
| $SiO_2/X_2O_a$ | 20-100 |
| $Q/SiO_2$ | 0.1-0.2 |
| $M/SiO_2$ | 0.2-0.6 | wherein:
(1) X is selected from the group consisting of trivalent and pentavalent elements from Groups 3-13 of the Periodic Table, and mixtures thereof;
(2) stoichiometric variable a equals the valence state of compositional variable X (e.g. when X is trivalent, a=3; when X is pentavalent, a=5);
(3) M is selected from the group consisting of elements from Groups 1 and 2 of the Periodic Table; and
(4) Q is the cationic structure directing agent.

11. The method of claim 10, wherein X is selected from the group consisting of Ga, Al, Fe, B, In, and mixtures thereof.

12. The method of claim 1, wherein the reaction mixture further comprises CHA seed crystals.

13. The method of claim 1, wherein the alkali metal silicate is sodium silicate.

14. The method of claim 1, wherein the CHA-type molecular sieve is prepared from a reaction mixture comprising, in terms of mole ratios, the following:

| | |
|---|---|
| $SiO2/X_2O_a$ | 20-100 |
| $M/SiO_2$ | 0.2-0.6 |
| $Q/SiO_2$ | 0.1-0.3 |
| $OH^-/SiO_2$ | 0.2-0.7 |
| $H_2O/SiO_2$ | 25-40 | wherein:
(1) X is selected from the group consisting of trivalent and pentavalent elements from Groups 3-13 of the Periodic Table, and mixtures thereof;
(2) stoichiometric variable a equals the valence state of compositional variable X (e.g. when X is trivalent, a=3; when X is pentavalent, a=5);
(3) M is selected from the group consisting of elements from Groups 1 and 2 of the Periodic Table; and
(4) Q is the cationic structure directing agent.

15. The method of claim 14, wherein the CHA-type molecular sieve has a composition comprising, in terms of mole ratios, the following:

| | |
|---|---|
| $SiO_2/X_2O_a$ | 20-100 |
| $Q/SiO_2$ | 0.1-0.2 |
| $M/SiO_2$ | 0.2-0.6. |

16. The method of claim 15, wherein X is selected from the group consisting of Ga, Al, Fe, B, In, and mixtures thereof.

* * * * *